US008472581B2

(12) United States Patent
Young

(10) Patent No.: US 8,472,581 B2
(45) Date of Patent: Jun. 25, 2013

(54) REACTOR VESSEL REFLECTOR WITH INTEGRATED FLOW-THROUGH

(75) Inventor: Eric Paul Young, Corvallis, OR (US)

(73) Assignee: NuScale Power, LLC, Corvallis, OR (US)

( * ) Notice: Subject to any disclaimer, the term of this patent is extended or adjusted under 35 U.S.C. 154(b) by 652 days.

(21) Appl. No.: 12/272,215

(22) Filed: Nov. 17, 2008

(65) Prior Publication Data

US 2010/0124306 A1   May 20, 2010

(51) Int. Cl.
    *G21C 5/00* (2006.01)
(52) U.S. Cl.
    USPC ............ 376/458; 376/347; 376/361; 376/366
(58) Field of Classification Search
    USPC .......................................... 376/366, 458, 361
    See application file for complete search history.

(56) References Cited

U.S. PATENT DOCUMENTS

| 3,599,589 | A | | 8/1971 | Busey |
| 3,865,688 | A | | 2/1975 | Kleimola |
| 4,701,299 | A | | 10/1987 | Alibran et al. |
| 4,731,220 | A | * | 3/1988 | Kim, Jr. .......................... 376/458 |
| 5,087,408 | A | | 2/1992 | Tominaga et al. |
| 5,276,720 | A | | 1/1994 | Oosterkamp et al. |
| 6,795,518 | B1 | | 9/2004 | Conway et al. |

FOREIGN PATENT DOCUMENTS

| GB | 1036935 | | 7/1966 |
| JP | 8-15474 | * | 6/1994 |
| JP | 2003114292 | | 4/2003 |

OTHER PUBLICATIONS

JP 2003-114292 (IDS), English language translation, pp. 16.*

International Search Report and Written Opinion of the International Searching Authority for International Application No. PCT/US2009/064839, Mar. 17, 2010.
Modro, S.M., et al.; 'Multi-Application Small Light Water Reactor Final Report; Idaho National Engineering and Environmental Laboratory; Dec. 2003; Idaho Falls, ID, U.S.A.
IAEA; IAEA Tecdoc 1391—Status of Advanced Light Water Reactor Designs 2004; May 2004; pp. 279-306, 489-512; Nuclear Power Technology Development Section, International Atomic Energy Agency; Vienna; Austria.
IAEA; IAEA Tecdoc 1485—Status of Innovative Small and Medium Sized Reactor Designs 2005; Mar. 2006; pp. 93-162; Nuclear Power Technology Development Section, International Atomic Energy Agency; Vienna; Austria.
Dr. Jose N. Reyes, Jr., "NuScale Power Introduction to NuScale Design" U.S. Nuclear Regulatory Commission Pre-Application Meeting, Rockville, MD, Jul. 24, 2008 (26 pages).
Extended European Search Report for European Application No. 12196300.3, Feb. 5, 2013, 8 pages.
Non-Final Rejection; Kim, Oct. 25, 2012; Korea, Republic of; 10-2011-7013868; 5 pages.
Reyes et al.; "Testing of the multi-application small light water reactor (MASLWR) passive safety systems" Nuclear Engineering and Design, Amsterdam, NL, vol. 237 No. 18, Aug. 25, 2007.

* cited by examiner

*Primary Examiner* — Jack W Keith
*Assistant Examiner* — Marshall O'Connor
(74) *Attorney, Agent, or Firm* — Fish & Richardson P.C.

(57) ABSTRACT

A nuclear reactor module includes a reactor core and a reactor housing that surrounds the reactor core about its sides, wherein the reactor housing is configured to direct coolant through the reactor core. A neutron reflector is located between the reactor core and the reactor housing, wherein the neutron reflector has a plurality of inlet ports facing the reactor core. The neutron reflector also has a plurality of outlet ports fluidly connected to the inlet ports to direct a portion of the coolant through the neutron reflector.

22 Claims, 7 Drawing Sheets

REACTOR VESSEL REFLECTOR WITH INTEGRATED FLOW-THROUGH

TECHNICAL FIELD

The invention relates to the field of nuclear power generation, including systems designed to cool a reactor core.

BACKGROUND

In nuclear reactors designed with passive operating systems, the laws of physics are employed to ensure that safe operation of the nuclear reactor is maintained during normal operation or even in an emergency condition without operator intervention or supervision, at least for some predefined period of time. A nuclear reactor 5 includes a reactor core 6 surrounded by a reactor vessel 2. Water 10 in the reactor vessel 2 surrounds the reactor core 6. The reactor core 6 is further located in a shroud 122 which surround the reactor core 6 about its sides. When the water 10 is heated by the reactor core 6 as a result of fission events, the water 10 is directed from the shroud 122 and out of a riser 124. This results in further water 10 being drawn into and heated by the reactor core 6 which draws yet more water 10 into the shroud 122. The water 10 that emerges from the riser 124 is cooled down and directed towards the annulus 123 and then returns to the bottom of the reactor vessel 2 through natural circulation. Pressurized steam 11 is produced in the reactor vessel 2 as the water 10 is heated.

A heat exchanger 135 circulates feedwater and steam in a secondary cooling system 130 in order to generate electricity with a turbine 132 and generator 134. The feedwater passes through the heat exchanger 135 and becomes super heated steam. The secondary cooling system 130 includes a condenser 136 and feedwater pump 138. The steam and feedwater in the secondary cooling system 130 are isolated from the water 10 in the reactor vessel 2, such that they are not allowed to mix or come into direct contact with each other.

The reactor vessel 2 is surrounded by a containment vessel 4. The containment vessel 4 is designed so that water or steam from the reactor vessel 2 is not allowed to escape into the surrounding environment. A steam valve 8 is provided to vent steam 11 from the reactor vessel 2 into an upper half 14 of the containment vessel 4. A submerged blowdown valve 18 is provided to release the water 10 into suppression pool 12 containing sub-cooled water.

Water 10 circulates through the reactor vessel 2 as a result of temperature and pressure differentials that develop as a result of heat generation through reactor operation and through heat exchange with the secondary cooling system 130. Accordingly, the efficiency of the circulation depends on the relative local thermal properties of the water 10 in the reactor module 5 as well as its physical design and geometry. Reactor core reflectors are provided to improve a performance of the reactor core and associated fission events. As a result of the close proximity of the reflector to the reactor core, the reflector tends to heat up. Primary coolant is used to cool the reflector, and coolant circulation through the reactor core is reduced as a result of the supply of water 10 needed for cooling the reactor core reflector. Conventional nuclear reactors must therefore rely on increased coolant volume, pumps, or other redundant system components to ensure sufficient performance.

The present invention addresses these and other problems.

SUMMARY OF THE INVENTION

A power module is disclosed herein, as comprising a reactor core and a reflector partially surrounding the reactor core to improve a neutron efficiency of the power module. The reflector comprises one or more inlets located adjacent the reactor core, wherein the one or more inlets are configured to receive coolant that has passed through at least a portion of the reactor core prior to entering the one or more inlets.

A nuclear reactor module is disclosed herein, as comprising a reactor core and a reactor housing that surrounds the reactor core about its sides, wherein the reactor housing is configured to direct coolant through the reactor core. A neutron reflector is located between the reactor core and the reactor housing, wherein the neutron reflector comprises a plurality of inlet ports facing the reactor core. The neutron reflector further comprises a plurality of outlet ports fluidly connected to the inlet ports to direct a portion of the coolant through the neutron reflector.

A method is disclosed herein, as comprising circulating a primary coolant into a reactor housing, and partitioning the primary coolant into a first portion and a second portion. The first portion passes entirely through a reactor core located in the reactor housing, and the second portion passes partially through the reactor core before entering an inlet of a neutron reflector. The second portion of the primary coolant is directed through the neutron reflector.

The invention will become more readily apparent from the following detailed description of a preferred embodiment of the invention which proceeds with reference to the accompanying drawings.

DESCRIPTION OF EXAMPLE EMBODIMENTS

Various embodiments disclosed or referred to herein may be operated consistent, or in conjunction, with features found in co-pending U.S. application Ser. No. 11/941,024 which is herein incorporated by reference in its entirety.

Figure 2:
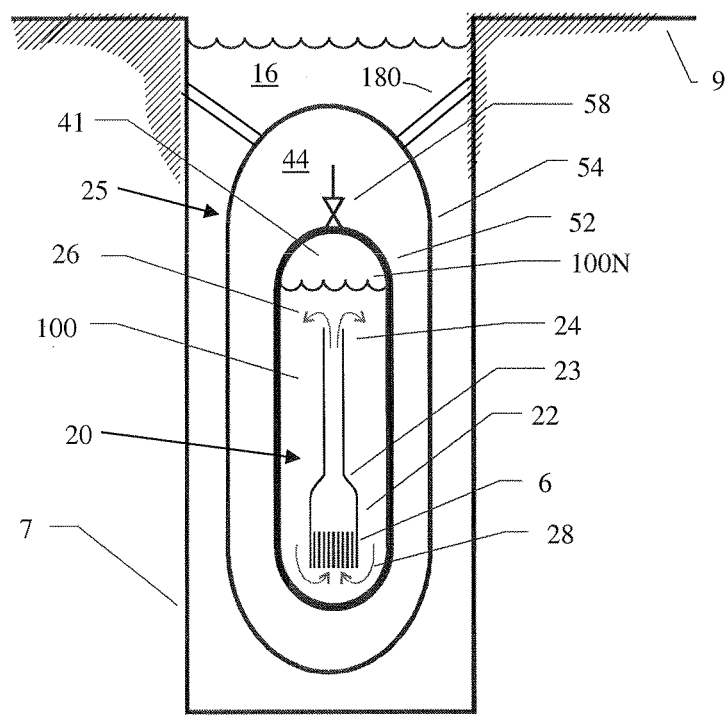
FIG. 2 illustrates a power module assembly comprising an internally dry containment vessel. .

FIG. 2 illustrates a power module assembly 25 comprising an internally dry containment vessel 54. The containment vessel 54 is cylindrical in shape, and has ellipsoidal, domed or hemispherical upper and lower ends. The entire power module assembly 25 may be submerged in a pool of water 16 which serves as an effective heat sink. The containment vessel 54 may be welded or otherwise sealed to the environment, such that liquids and gas do not escape from, or enter, the power module assembly 25. The containment vessel 54 may be supported at any external surface.

In one embodiment, the containment vessel 54 is suspended in the pool of water 16 by one or more mounting connections 180. The pool of water 16 and the containment vessel 54 may further be located below ground 9 in a reactor bay 7. A reactor vessel 52 is located or mounted inside the containment vessel 54. An inner surface of the reactor vessel 52 may be exposed to a wet environment including a coolant 100 or liquid, such as water, and an outer surface may be exposed to a dry environment such as air. The reactor vessel 52 may be made of stainless steel or carbon steel, may include cladding, and may be supported within the containment vessel 54.

The power module assembly 25 may be sized so that it can be transported on a rail car. For example, the containment vessel 54 may be constructed to be approximately 4.3 meters in diameter and approximately 17.7 meters in height (length). Refueling of the reactor core 6 may be performed by transporting the entire power module assembly 50 by rail car or overseas, for example, and replacing it with a new or refurbished power module assembly which has a fresh supply of fuel rods.

The containment vessel 54 encapsulates and, in some conditions, cools the reactor core 6. It is relatively small, has a high strength and may be capable of withstanding six or seven times the pressure of conventional containment designs in part due to its smaller overall dimensions. Given a break in the primary cooling system of the power module assembly 25 no fission products are released into the environment. Decay heat may be removed from the power module assembly 25 under emergency conditions.

The reactor core 6 is illustrated as being submerged or immersed in a primary coolant 100, such as water. The reactor vessel 52 houses the coolant 100 and the reactor core 6. A reactor housing 20 comprises a shroud 22 in a lower portion and a riser 24 in an upper portion of the reactor housing 20. The riser 24 may be substantially cylindrical in shape. The shroud 22 surrounds the reactor core 6 about its sides and serves to direct the coolant 100 (shown as coolant flow 26, 28) up through the center of the riser 24 located in the upper half of the reactor vessel 52, then back down the annulus 23, as a result of natural circulation of the coolant 100. In one embodiment, the reactor vessel 52 is approximately 2.7 meters in diameter and includes an overall height (length) of approximately 13.7 meters. The reactor vessel 52 may include a predominately cylindrical shape with ellipsoidal, domed or hemispherical upper and lower ends. The reactor vessel 52 is normally at operating pressure and temperature. The containment vessel 54 is internally dry and may operate at atmospheric pressure with wall temperatures at or near the temperature of the pool of water 16.

The containment vessel 54 substantially surrounds the reactor vessel 52 and may provide a dry, voided, or gaseous environment identified as containment region 44. Containment region 44 may comprise an amount of air or other fill gas such as Argonne or other noble gas. The containment vessel 54 includes an inner surface or inner wall which is adjacent to the containment region 44. The containment region 44 may include a gas or gases instead of or in addition to air. In one embodiment, the containment region 44 is maintained at or below atmospheric pressure, for example as a partial vacuum. Gas or gasses in the containment vessel may be removed such that the reactor vessel 52 is located in a complete or partial vacuum in the containment region 44.

Figure 1:
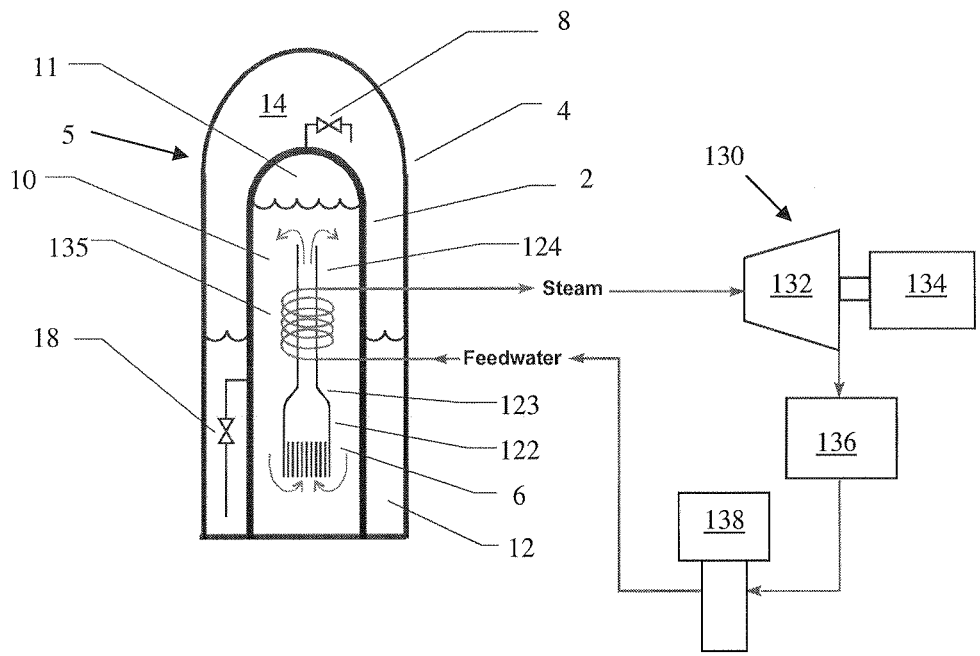
FIG. 1 illustrates a nuclear power system

During normal operation, thermal energy from the fission events in the reactor core 6 causes the coolant 100 to heat. As the coolant 100 heats up, it becomes less dense and tends to rise up through the riser 24. As the coolant 100 temperature reduces, it becomes relatively denser than the heated coolant and is circulated around the outside of the annulus 23, down to the bottom of the reactor vessel 52 and up through the shroud 22 to once again be heated by the reactor core 6. This natural circulation causes the coolant 100 (shown as coolant flow 26, 28) to cycle through the heat exchanger 135 of FIG. 1, transferring heat to a secondary coolant, such as the secondary cooling system 130 of FIG. 1, to generate electricity.

Figure 3:
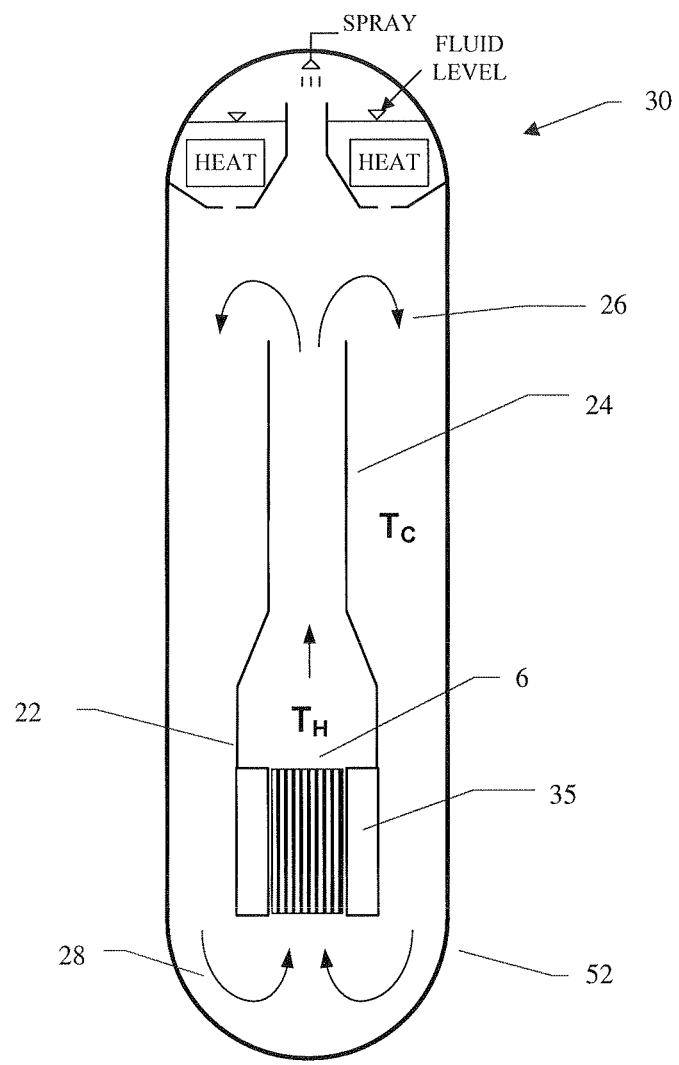
FIG. 3 illustrates a partial cross sectional side view of an embodiment of a power module assembly comprising a reactor core surrounded by a neutron reflector.

FIG. 3 illustrates a cross sectional side view of an embodiment of a power module assembly 30 comprising a reactor core 6 surrounded by a neutron reflector 35. The neutron reflector 35 may partially or completely surround the reactor core 6 about its sides. In one embodiment, the neutron reflector 35 is externally cylindrical in shape, and internally matched to the reactor core perimeter. The neutron reflector 35 may be manufactured using stainless steel. The power module assembly 30 is illustrated as including a spray and one or more heaters to help control pressure within the reactor vessel 52.

The neutron reflector 35 may be located between the reactor housing 22 and the reactor core 6. In one embodiment, the neutron reflector 35 is integrated with the reactor housing 22, such that an outer surface of the neutron reflector 35 forms a part of the downcomer region. Uranium or other reactor core materials may fission by splitting into smaller nuclei. The fission event also results in a release of a few neutrons and a large release of energy in the form of fission product motion, gamma rays (gammas), neutrons, and neutrinos. The neutron reflector 35 maintains a neutron efficiency of the power module assembly 30, wherein neutrons that escape the reactor core 6 during fission events are reflected back towards the reactor core 6. The neutron reflector 35 also absorbs or moderates fission products (e.g. gammas and neutrons) to protect the reactor vessel 52 from damage. As a result of absorbing some of the gammas and neutrons, the neutron reflector 35 tends to heat up over time.

Primary coolant 28 flows through the reactor core 6 to become relatively hot coolant $T_H$. Coolant flow 26 exiting the top of the riser 24 is directed down the annulus, after which heat from the hot coolant $T_H$ is transferred to a heat exchanger, and then recirculated back down the reactor vessel 52 to the reactor core 6. The coolant flow 28 that circulates up through the reactor core 6 also operates to cool a surface of the neutron reflector 35, but as the thickness of the neutron reflector 35 is increased to improve neutron efficiencies, this cooling of the surface may be insufficient to protect the neutron reflector 35 from overheating.

Figure 4:
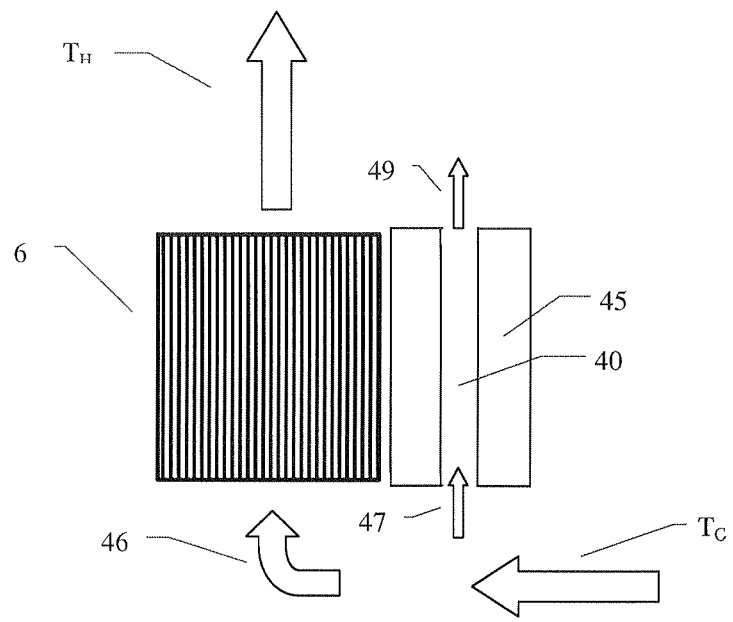
FIG. 4 illustrates a partial view of a power module assembly comprising a reactor core and a conventional reflector.

FIG. 4 illustrates a partial view of a power module assembly comprising a reactor core 6 and a conventional reflector 45. Coolant flow $T_C$ circulating past the reflector 45 is partially diverted to flow through a vertical bypass hole 40 provided through the length of the reflector 45. The remainder of the coolant flow $T_C$ flows through the reactor core 6. Accordingly, coolant flow $T_C$ is divided into two parts, including coolant flow 46 which passes through the reactor core 6, and coolant flow 47 which passes through the bypass holes 40 of reflector 45.

Either of coolant flows 46, 47 (taken individually) include smaller coolant flow rates as compared with coolant flow $T_C$. Coolant flow 47 does not pass through the reactor core 6. Accordingly, the effective flow rate of coolant flow $T_C$ that passes through the reactor core 6 is reduced by an amount equal to coolant flow 47. This reduces an operating efficiency of the power module, as additional coolant must be provided to the system, or a flow rate of the coolant must be augmented by pumps to make up for the coolant flow 47 that is diverted through the reflector 45.

Figure 5:
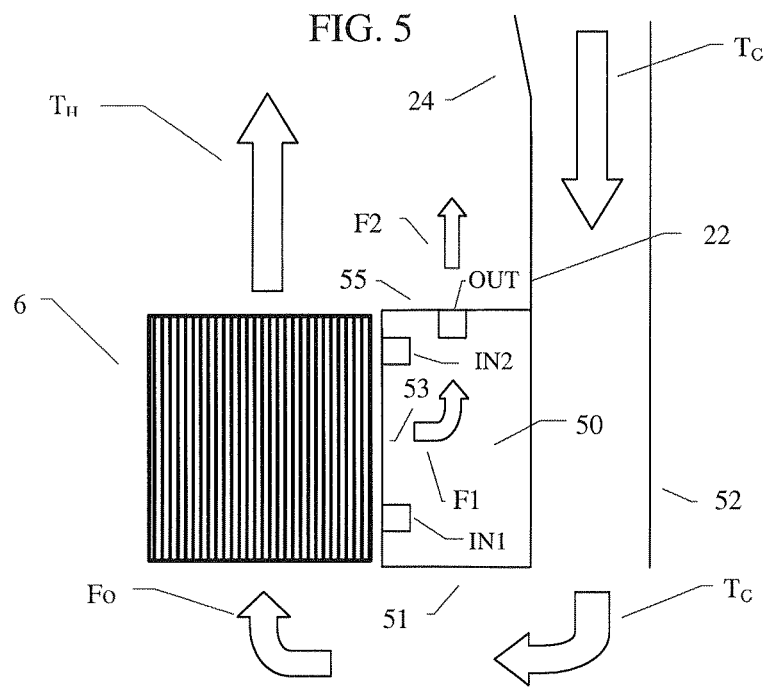
FIG. 5 illustrates a partial view of an example power module assembly comprising a reactor core and a novel neutron reflector.

FIG. 5 illustrates a partial view of an example power module assembly comprising a reactor core 6 and a novel neutron reflector 50. Reactor housing 22 surrounds the reactor core 6 about its sides to direct the coolant $T_C$ through the reactor core 6. Neutron reflector 50 is located between the reactor housing 22 and the reactor core 6. In one embodiment, the neutron reflector 50 partially or completely surrounds the reactor core 6 about its sides to improve a neutron efficiency of the power module. The neutron reflector 50 comprises one or more inlets IN1, IN2 located adjacent the reactor core 6, wherein the one or more inlets IN1, IN2 are configured to receive coolant F1 that has passed through at least a portion of the reactor core 6 prior to entering the one or more inlets IN1, IN2.

The neutron reflector 50 comprises a lower end 51, an upper end 55, and a side wall 53 that faces the reactor core 6, wherein the one or more inlets IN1, IN2 are located in the side wall 53. The first inlet IN1 is located at a lower elevation than the second inlet IN2. The first inlet IN1 is configured to receive coolant that passes through a lower portion of the reactor core 6. The second inlet IN2 is located at a higher elevation than the first inlet IN1. The second inlet IN2 is configured to receive coolant that passes through an upper portion of the reactor core 6. By drawing the coolant into the inlets IN1, IN2 at the different elevations rather than at the bottom of the neutron reflector 50, all the coolant is drawn, at least partially, through the heated reactor core 6, rather than bypassing the heated reactor core 6.

By drawing the coolant through inlets located at different heights, the coolant may immediately be used to cool down different regions of the neutron reflector 50 simultaneously, without having to wait for coolant to pass through the entire length of the neutron reflector 50. Conventional reflectors, on the other hand, preferentially cool a lower portion of the reflector, at a point where the coolant enters the bypass hole (reference FIG. 4). However, the lower portion of the reflector may in fact not be experiencing the greatest amount of heat generation due to the axial power distribution of the reactor core.

Coolant $T_C$ that circulates within the reactor vessel 52 enters the reactor core 6 as coolant flow Fo. In one embodiment, the flow rate associated with coolant $T_C$ is the same as the flow rate associated with coolant flow Fo that enters the bottom of the reactor core 6. Coolant that has partially passed through the reactor core 6 enters the one or more inlets IN1, IN2 as coolant cross-flow F1. Coolant cross-flow F1 cools down the neutron reflector 50 as it travels between the one or more inlets IN1, IN2 and one or more outlets OUT. The one or more outlets OUT are located at the top surface or upper end 55 of the neutron reflector 50. Coolant flow F2 exits the neutron reflector 6 via the one or more outlets OUT. In one embodiment, the flow rate associated with coolant flow F2 is the same as the flow rate associated with coolant cross-flow F1. Coolant flow F2 joins the coolant flow $T_H$ which exits the reactor core 6. In one embodiment, the flow rate associated with coolant flow Fo is the same as the sum of coolant flows F2 and $T_H$.

In one embodiment, coolant cross-flow F1 enters the one or more inlets IN1, IN2 as single-phase liquid. Coolant flow F2 exits the one or more outlets OUT as two-phase steam/liquid or single-phase steam. Coolant flow F2 that exits the one or more outlets OUT introduces voiding into the riser section 24 and reduces the effective coolant density within the core elevations, enhancing coolant flow rates in the power module. Increasing the flow rate also results in a smaller change in temperature across the reactor core 6. The voiding enhances flow through the reactor core 6 and also increases primary side heat transfer coefficients inside the steam generator region.

Having single-phase or two-phase coolant including steam in the neutron reflector 50 reduces the amount of moderation of neutrons that otherwise occurs within the neutron reflector 50, increasing neutron reflection efficiency. As steam or boiling heat transfer allows for more efficient heat removal as compared to single phase liquid coolant, less reflector material may be removed to provide for cooling of the internal portion of the neutron reflector 50, thereby enhancing neutron reflection efficiencies, or neutron economy. Neutron efficiencies are further improved as a result of providing steam in the single-phase or two-phase coolant within the neutron reflector 50. As steam is a poor moderator of neutrons as compared to liquid coolant, fewer neutrons are moderated as a result of drawing the super heated single-phase coolant from the core region. Providing a more efficient neutron reflector results in increased flow rates through the reactor core 6, and allows the power module to be operated at an increased operating power.

Figure 6:
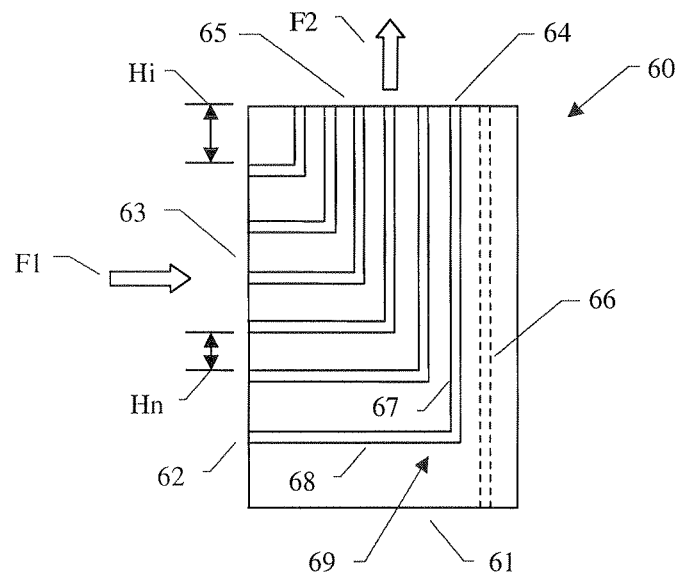
FIG. 6 illustrates a partial cutaway view of an example neutron reflector comprising horizontal and vertical coolant flow-through channels.

FIG. 6 illustrates a partial cutaway view of an example neutron reflector 60 comprising horizontal and vertical coolant flow-through channels 69. The neutron reflector 60 may be understood as being located adjacent reactor core 6 (FIG. 5). In one embodiment, the neutron reflector 60 is located between the reactor core 6 and the reactor housing 22 of FIG. 5. The neutron reflector 60 comprises a plurality of inlet ports 62 facing the reactor core 6. The neutron reflector 60 further comprises a plurality of outlet ports 64 fluidly connected to the inlet ports 62, to direct a portion of the coolant F1 through the neutron reflector 60. The inlet ports 62 are shown located at different elevations along the side wall 63.

The inlet ports 62 are located on a side wall 63 of the neutron reflector 60, whereas outlet ports 64 are located on the upper end 65 of the neutron reflector 60. Coolant exits the neutron reflector 60 via the outlet ports 64 as coolant flow F2. In one embodiment, coolant flow F2 is equal to coolant cross-flow F1. Inlet ports 62 and outlet ports 64 are fluidly connected by a plurality of flow-through channels 69. The first part of flow-through channel 69 comprises an approximately horizontal section 68, whereas a second part of flow-through channel 69 comprises an approximately vertical section 67. Horizontal channel 68 is shown connected to the inlet port 62, whereas vertical channel 67 is shown connected to the outlet port 64. In one embodiment, an optional, approximately vertical channel 66 is provided to help cool down the neutron reflector 60. The optional, approximately vertical channel 66 draws coolant from the lower end of the neutron reflector 60.

Spacing between inlet ports 62 may vary. For example, a first spacing Hi between inlet ports may be greater than a second spacing Hn between inlet ports. Spacing between inlet ports 62 at or near the center of the reactor core 6 may be less than spacing between inlet ports 62 at or near either end of the reactor core 6. The number or concentration of inlet ports 62 may be greater at or near the center of the reactor core 6 as compared to the number or concentration of inlet ports 62 at or near either end of the reactor core 6. In one embodiment, the spacing of the inlet ports is made to vary according to the axial power generation profile of the reactor core 6 as well as the fluid conditions. In one embodiment, the inlet port spacing is arranged to match the point at which boiling occurs within the neutron reflector 60. Multiple input ports located at different vertical positions along the reactor core 6 provide for cooling of the neutron reflector 60 in a staged manner. The channel diameter or channel size may vary to allow more or less coolant F1 to pass through any one of the inlet ports 62. Channel size near the center of the reactor core 6 may be greater than the channel size at either end of the reactor core 6.

Figure 7:
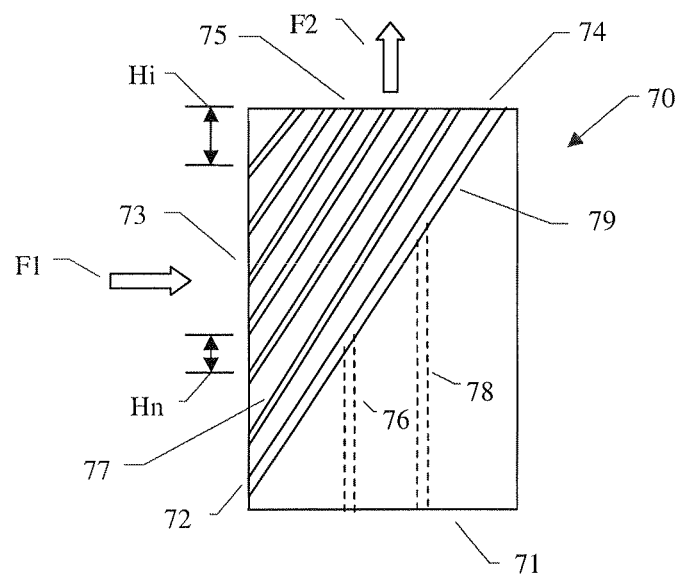
FIG. 7 illustrates a partial cutaway view of an example neutron reflector comprising diagonal or angled coolant flow-through channels.

FIG. 7 illustrates a partial cutaway view of an example neutron reflector 70 comprising a number of sloped or diagonal coolant flow-through channels 79. The sloped coolant flow-through channels 79 fluidly couple one or more inlets 72 located in a side wall 73 of the neutron reflector 70 to one or more outlets 74 located in an upper end 75 of the neutron reflector 70. Coolant cross-flow F1 that has partially passed through reactor 6 (FIG. 5) enters the one or more inlets 72, passes through the sloped coolant flow-through channels 79, and exits the outlets F2 as coolant flow F2. In one embodiment, coolant flow F2 equals coolant cross-flow F1.

Inlet port spacing Hi, Hn may vary with elevation of the inlet ports 72. A height or width of the sloped coolant flow-through channels 79 may also vary, allowing more or less coolant cross-flow F1 to pass through different portions of the neutron reflector 70. In one embodiment, one or more optional, approximately vertical channels 76, 78 are provided to allow additional coolant to pass through a lower portion of the neutron reflector 70. The one ore more approximately vertical channels 76, 78 are shown connect to one of the sloped coolant flow-through channels 79, however they may alternatively connect to their own respective outlets (no shown) located in the upper end 75 of the neutron reflector. When one or more of the optional, approximately vertical channels 76, 68 are provided in the neutron reflector 70, coolant cross-flow F1 may be less than coolant flow F2.

Figure 8:
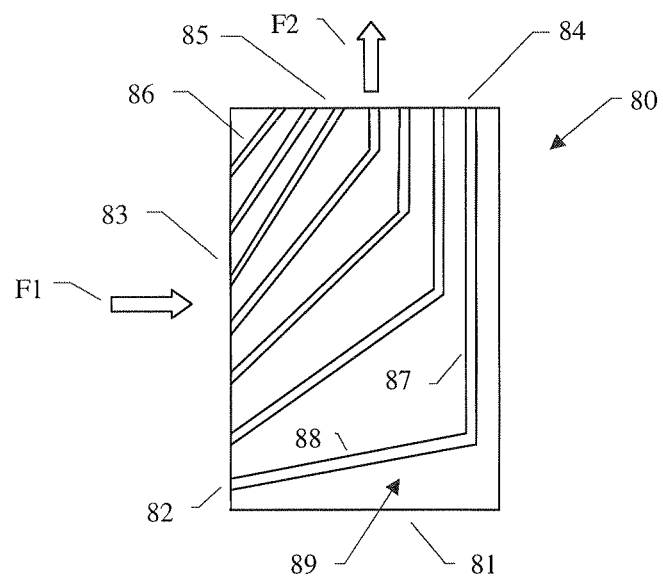
FIG. 8 illustrates a partial cutaway view of an example neutron reflector comprising diagonal and vertical coolant flow-through channels.

FIG. 8 illustrates a partial cutaway view of an example neutron reflector 80 comprising diagonal and vertical coolant flow-through channels 89. The coolant flow-through channels 89 fluidly couple one or more inlets 82 located in a side wall 83 of the neutron reflector 80 to one or more outlets 84 located in an upper end 85 of the neutron reflector 80. Coolant cross-flow F1 that has partially passed through reactor core 6 (FIG. 5) enters the one or more inlets 82, passes through the sloped coolant flow-through channels 89, and exits the outlets F2 as coolant flow F2. In one embodiment, coolant flow F2 equals coolant cross-flow F1.

The first part of channel 89 comprises and angled or sloped section 88, whereas a second part of channel 89 comprises an approximately vertical section 87. Horizontal channel 88 is shown connected to the inlet port 82, whereas the approximately vertical channel 87 is shown connected to the outlet port 84. In one embodiment, none of the channels or ports are connected to the bottom end 81 of the neutron reflector 80.

The various embodiments of the neutron reflector may comprise any number or combination of horizontal, vertical, sloped, diagonal or otherwise oriented channels, and those embodiments illustrated herein are not intended to limit any such combinations. Furthermore, the number of inlet ports may not equal the number of outlet ports, as one or more channels may connect multiple ports together.

Figure 9:
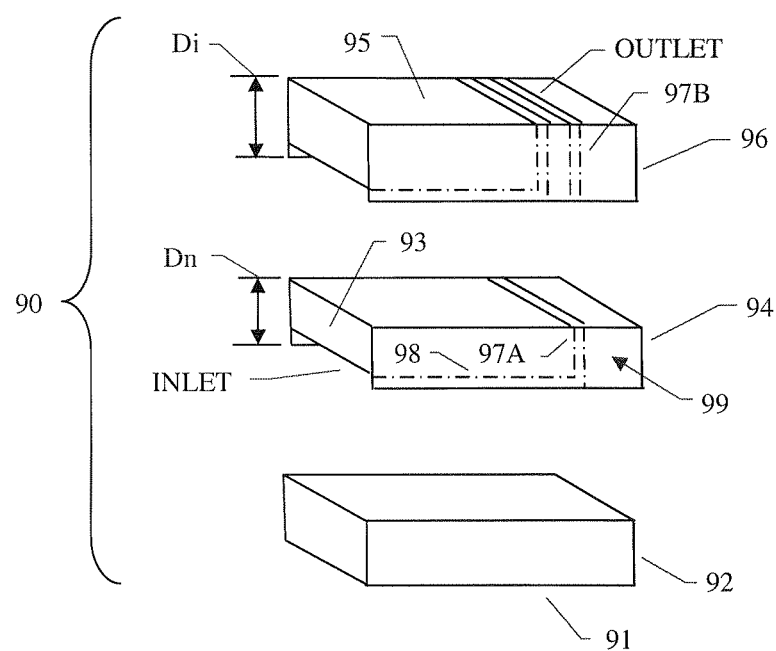
FIG. 9 illustrates an elevated perspective view of an example neutron reflector comprising a plurality of layered plates.

FIG. 9 illustrates an elevated perspective view of an example neutron reflector 90 comprising a plurality of layered plates 92, 94, 96. FIG. 9 may be understood as a method of manufacturing or a method of assembling a neutron reflector, wherein FIG. 9 illustrates an exploded view of the neutron reflector 90. When assembled, lower plate 92 is adjacent to and in contact with plate 94, whereas plate 94 is adjacent to and in contact with upper plate 96. An upper surface of upper plate 96 may be understood as providing an upper end 95 of the neutron reflector 90. A lower surface of lower plate 92 may be understood as providing a lower end 91 of the neutron reflector 90. A side surface of one or all of the plates 92, 94, 96 may form the side wall 93 of the neutron reflector 90.

The neutron reflector 90 comprises the plurality of plates 92, 94, 96 layered together, wherein a flow-through channel 99 is formed, at least in part, between adjacent plates 92, 94. Flow-through channel 99 fluidly connects at least one of the inlet ports INLET to at least one of the outlet ports OUTLET. The flow-through channel 99 comprises an approximately horizontal channel 98 that passes between the adjacent plates 92, 94. An upper portion of the approximately horizontal channel 98 is recessed into a lower surface of a first plate, such as middle plate 94, wherein the approximately horizontal channel 98 comprises a lower portion that is bounded by an upper surface of a second plate, such as lower plate 92. The lower surface of the middle plate 94 is located adjacent to the upper surface of the lower plate 92 when the neutron reflector 90 is fully assembled. Another channel is shown formed between middle plate 94 and upper plate 96.

In one embodiment, the horizontal channel 98 is etched into the lower surface of the middle plate 94. In another embodiment, a portion, or all, of the flow-through channel 99 is machined out of one or more of the plates.

The approximately horizontal channel 98 is connected to an approximately vertical channel 97A that passes through the middle plate 94. Channel 97A is aligned with channel 97B of upper plate 96, such that the cumulative vertical channel 97A,B passes through two or more of the plurality of plates. The horizontal channel 98 is connected to inlet port INLET, and the vertical channels 97A, B is connected to outlet port OUTLET. In one embodiment, horizontal channel 98 and vertical channels 97A,B are configured to fluidly couple the inlet port INLET to the outlet port OUTLET when assembled as a neutron reflector. The upper plate 96 may comprise one or more approximately vertical channels that only passes through a single plate.

In one embodiment, at least some of the plurality of plates 92, 94, 96 have different thicknesses, wherein a distance between inlet ports varies according to the different thicknesses of the plurality of plates. For example, middle plate 94 has a thickness of Dn, whereas upper plate 96 has a thickness of Di. In one embodiment, plate thickness Di associated with an upper end of the neutron reflector 90 is larger or greater than plate thickness Dn associated with a central portion of the neutron reflector 90.

The number of plates are shown as being three for simplicity of illustration, whereas other embodiments could include a lesser or greater number of plates. In one embodiment, the number of plates in the neutron reflector 90 is approximately equal to the number of horizontal channels. In another embodiment, the number of plates is greater than the number of horizontal channels. In yet another embodiment, for example where multiple horizontal channels are formed between any two adjacent plates, the number of plates may be fewer than the number of horizontal channels. The construction illustrated by FIG. 9 minimizes or reduces machining costs and material waste that are associated with conventional designs. Whereas the horizontal channels are illustrated as slots or channels, the ports may comprise circular holes in certain embodiments. For example, circular inlet or outlet ports may be drilled, machined, or otherwise formed in or through the neutron reflector.

Figure 10:
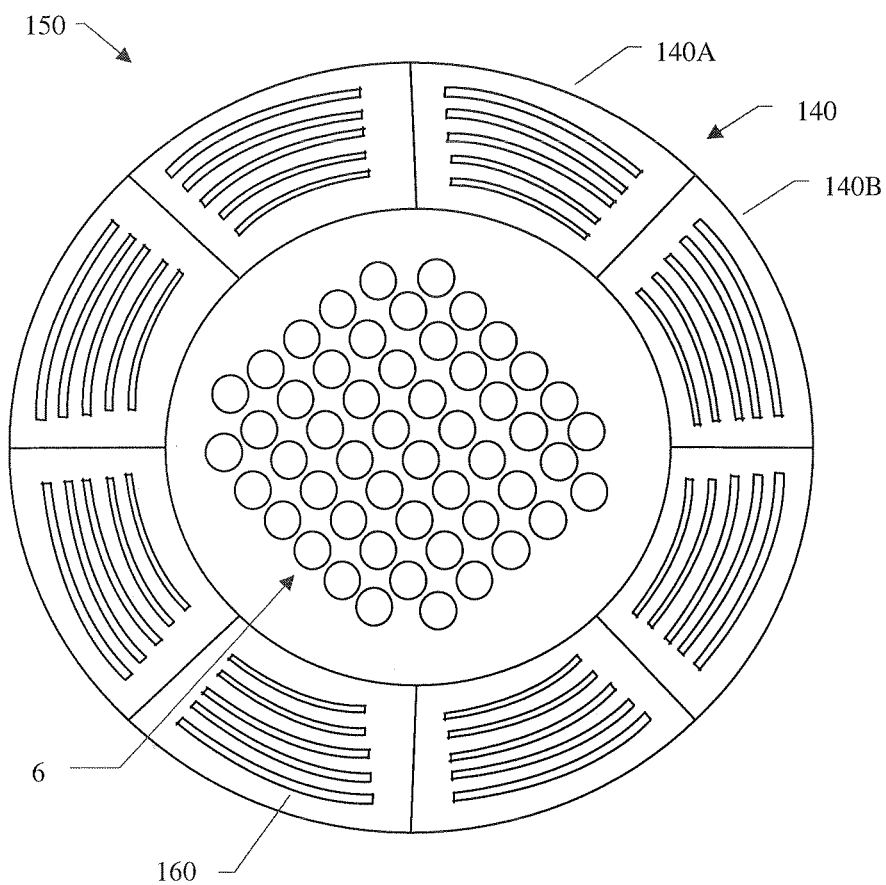
FIG. 10 illustrates a cross-sectional top view of a power module assembly including a reactor core and neutron reflector.

FIG. 10 illustrates a partial cross-sectional top view of a power module assembly 150 including a reactor core 6 surrounded by a neutron reflector 140 about its perimeter. The neutron reflector 140 comprises a plurality of outlet ports 160 configured to output a coolant flow that has partially passed through the reactor core 6. Neutron reflector 140 may comprise a plurality of subsections 140A, 140B that are combined during assembly of the power module assembly 150. In one embodiment, each of the plurality of subsections 140A, 140B comprise a number of layered plates similar to those illustrated by the neutron reflector 90 of FIG. 9. Whereas the outlet ports 160 are illustrated as slots or channels, the ports may comprise circular holes in certain embodiments. For example, circular outlet ports may be drilled, machined, or otherwise formed in or through the neutron reflector.

Figure 11:
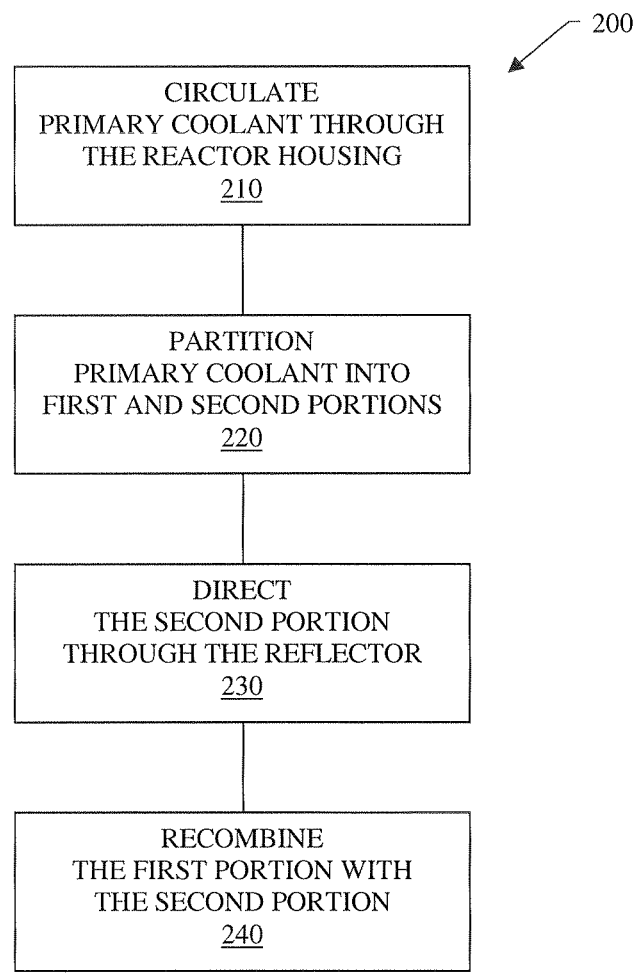
FIG. 11 illustrates a novel method of circulating coolant through a reactor housing using a neutron reflector configured to receive coolant flow from a reactor core.

FIG. 11 illustrates a novel method 200 of circulating coolant through a reactor housing using a neutron reflector configured to receive coolant flow from a reactor core. The method 200 may be understood to operate with, but not limited by, various embodiments illustrated herein as FIGS. 1-10.

At operation 210, a primary coolant is circulated into a reactor housing.

At operation 220, the primary coolant is partitioned into a first portion and a second portion, wherein the first portion passes entirely through a reactor core located in the reactor housing, and wherein the second portion passes partially through the reactor core before entering an inlet of a neutron reflector. In one embodiment, the inlet is located in a side wall of the neutron reflector, wherein the side wall faces the reactor core.

At operation 230, the second portion of the primary coolant is directed through the neutron reflector. In one embodiment, the second portion of the primary coolant enters the neutron reflector primarily as single-phase liquid, or two-phase liquid and vapor.

At operation 240, the second portion of the primary coolant that exits the neutron reflector is recombined with the first portion of the primary coolant that passes through the reactor core. The second portion of the primary coolant may be recombined with the first portion within the reactor housing to increase a flow rate of the primary coolant through the reactor core. In one embodiment, the second portion of the primary coolant exits the neutron reflector as two-phase steam and liquid. In yet another embodiment, the second portion of the primary coolant exits the neutron reflector as single-phase steam.

Although the embodiments provided herein have primarily described a pressurized water reactor, it should be apparent to one skilled in the art that the embodiments may be applied to other types of nuclear power systems as described or with some obvious modification. For example, the embodiments or variations thereof may also be made operable with a boiling water reactor.

Dimensions of the figures are not provided to scale, and in some cases certain features have been exaggerated in scale in order to illustrate or describe certain details. The flow rates of coolant in the reactor vessel, as well as other rates and values described herein are provided by way of example only. Other rates and values may be determined through experimentation such as by construction of full scale or scaled models of a nuclear reactor.

Having described and illustrated the principles of the invention in a preferred embodiment thereof, it should be apparent that the invention may be modified in arrangement and detail without departing from such principles. We claim all modifications and variation coming within the spirit and scope of the following claims.

The invention claimed is:

1. A power module comprising:
a reactor core having horizontal and vertical surfaces; and
a reflector partially surrounding the vertical surfaces of the reactor core to improve a neutron efficiency of the power module, wherein the reflector comprises one or more inlets located in the vertical surfaces adjacent the reactor core, and wherein the one or more inlets are configured to receive coolant that has passed through at least a portion of the reactor core prior to entering the one or more inlets, and wherein
the reflector comprises a plurality of horizontal plates, and wherein the horizontal plates adjacent a bottom portion of the reflector are thinner than the horizontal plates adjacent a top portion of the reflector.

2. The power module according to claim 1, wherein the one or more inlets comprises a plurality of inlets, and the reflector further comprises a plurality of outlets located at an upper end of the reflector, and wherein each inlet of the plurality of inlets is connected to a corresponding outlet of the plurality of outlets, the inlet and the corresponding outlet being coupled by a channel that passes through the reflector.

3. The power module according to claim 2, wherein a portion of the channel coupled to the inlet is oriented in an approximately horizontal direction.

4. The power module according to claim 3, wherein a portion of the channel connected to the corresponding outlet is oriented in an approximately vertical direction.

5. The power module according to claim 1, further comprising a reactor housing that surrounds the reactor core about its sides to direct the coolant through the reactor core, wherein the reflector is located between the reactor housing and the reactor core.

6. The power module according to claim 1, wherein the one or more inlets comprise a plurality of inlets located at different elevations.

7. The power module according to claim 6, wherein a first inlet located at a lower elevation is configured to receive coolant that passes through a lower portion of the reactor core, and wherein a second inlet located at a higher elevation is configured to receive coolant that passes through an upper portion of the reactor core.

8. A nuclear reactor module comprising:
a reactor core;
a reactor housing that surrounds the reactor core about the sides of the reactor core, wherein the reactor housing is configured to direct coolant through the reactor core; and
a neutron reflector located between the reactor core and the reactor housing, wherein the neutron reflector includes a plurality of inlet ports facing the reactor core, and wherein the neutron reflector further includes a plurality of outlet ports fluidly connected to the inlet ports to direct a portion of the coolant through the neutron reflector, wherein
the neutron reflector comprises a plurality of plates layered together, wherein a channel is formed between adjacent plates of the neutron reflector, and wherein the channel fluidly connects an inlet port to an outlet port, and
wherein at least some of the plurality of plates have different thicknesses, and wherein distance between inlet ports increases adjacent a top portion of the reflector and decreases adjacent a bottom portion of the reflector.

9. The nuclear reactor module according to claim 8, wherein the channel comprises an approximately horizontal channel that passes between the adjacent plates.

10. The nuclear reactor module according to claim 9, wherein the channel comprises an upper portion that is recessed into a lower surface of a first plate, wherein the channel comprises a lower portion that is bounded by an upper surface of a second plate, and wherein the lower surface of the first plate is located adjacent to the upper surface of the second plate.

11. The nuclear reactor module according to claim 9, wherein the approximately horizontal channel is connected to an approximately vertical channel that passes through two or more of the plurality of plates.

12. The nuclear reactor module according to claim 11, wherein the horizontal channel is connected to one of the inlet ports, and wherein the vertical channel is connected to one of the outlet ports.

13. The nuclear reactor module according to claim 8, wherein the number of channels comprises one or more sloped channels.

14. The nuclear reactor module according to claim 8, wherein at least some of the plurality of plates have different thicknesses, and wherein a distance between inlet ports varies according to the different thicknesses of the plurality of plates.

15. A power module comprising:
a reactor core comprising a lateral surface, a first end surface, a second end surface, and a flow path defined between and through the first and second end surfaces; and
a reflector at least partially surrounding the lateral surface of the reactor core and comprising at least two fluid circuits defined through the reflector, at least one of the fluid circuits comprising a portion that is transverse to the flow path, the at least two fluid circuits fluidly coupled between a portion of the flow path between the first and second end surfaces of the reactor core and a portion of the flow path that exits the reactor core at the second end surface of the reactor core.

16. The power module of claim 15, wherein the portion of the at least one fluid circuit comprises a first portion substantially perpendicular to the flow path, and the at least one fluid circuit further comprises a second portion substantially parallel to the flow path and fluidly coupled to the first portion of the fluid circuit.

17. The power module of claim 16, wherein the first portion is fluidly coupled to the portion of the flow path between the first and second end surfaces of the reactor core, and the second portion is fluid coupled to the portion of the flow path exiting the reactor core at the second end surface of the reactor core.

18. The power module of claim 16, wherein the reflector comprises a plurality of plates layered together, and substantially all of the first portion of the fluid circuit is defined through only one of the plurality of plates, and substantially all of the second portion of the fluid circuit is defined transversely through two or more of the plurality of plates.

19. The power module of claim 18, wherein one or more plates of the plurality of plates adjacent a bottom portion of the reflector is thinner than one or more plates of the plurality of plates adjacent a top portion of the reflector.

20. The power module according to claim 15, wherein the reflector further comprises a substantially vertical channel extending between a lower end surface of the reflector that is substantially coplanar with the first end surface of the reactor core and an upper end surface of the reflector that is substantially coplanar with the second end surface of the reactor core.

21. The power module according to claim 20, wherein the two or more fluid circuits defined through the reflector are fluidly decoupled from the substantially vertical channel.

22. The power module according to claim 15, further comprising a reactor housing that surrounds the reflector.

* * * * *